United States Patent

Welling

[11] Patent Number: 5,810,420
[45] Date of Patent: Sep. 22, 1998

[54] MEMO VISOR

[75] Inventor: Thomas L. Welling, Holland, Mich.

[73] Assignee: Prince Corporation, Holland, Mich.

[21] Appl. No.: 709,463

[22] Filed: Sep. 3, 1996

Related U.S. Application Data

[63] Continuation-in-part of Ser. No. 469,224, Jun. 6, 1995, abandoned.

[51] Int. Cl.⁶ ........................................................ B60J 3/00
[52] U.S. Cl. ................................................................ 296/97.5
[58] Field of Search ........................... 296/97.5; D12/191; D14/154, 191, 192, 218, 259; D13/168

[56] References Cited

U.S. PATENT DOCUMENTS

| | | | |
|---|---|---|---|
| 3,016,262 | 1/1962 | Hunt | 296/97.5 |
| 4,247,850 | 1/1981 | Marcus | 340/825.69 |
| 4,362,907 | 12/1982 | Polacsek | 455/345 |
| 4,875,229 | 10/1989 | Palatt et al. | 455/550 |
| 5,296,678 | 3/1994 | Schnorf | 219/203 |
| 5,364,153 | 11/1994 | Vaxelaire | 296/97.5 |
| 5,442,340 | 8/1995 | Dykema | 340/825.22 |

*Primary Examiner*—Andrew C. Pike
*Attorney, Agent, or Firm*—Price, Heneveld, Cooper, DeWitt & Litton

[57] ABSTRACT

A digital voice recorder is conveniently located within a vehicle body by a bezel positioned for convenient use by the vehicle operator. Preferably, the body is a visor and the bezel is elongated with a record switch and a playback switch in spaced relationship for easy operation. The digital voice recorder is microprocessor controlled to allow direct sequential access for playing back messages.

8 Claims, 2 Drawing Sheets

MEMO VISOR

CROSS-REFERENCE TO RELATED APPLICATION

This application is a continuation-in-part of U.S. patent application Ser. No. 08/469,224, filed Jun. 6, 1995, and entitled MEMO VISOR, now abandoned.

BACKGROUND OF THE INVENTION

The present invention relates to vehicle visors and particularly a visor having a digital voice recorder.

Typically, when in a vehicle traveling to and from work or if talking on a cellular telephone, errands, appointments, telephone calls, or other chores which require future activity are brought to the attention of or are thought of by the driver. In the past, for recording such items for future reference, a vehicle operator may have carried a memo pad which can be attached to the dashboard and removed for jotting down such items. In some instances, armrest consoles may include built-in memo pads or writing surfaces for listing such items. U.S. Pat. No. 4,875,229 discloses a visor mounted telephone and an analog tape answering and recording machine. Such a device has the usual complicated controls associated with an analog recorder and does not allow random access to a recorded message.

Recently, portable digital recording devices have become available for recording short messages, such as reminder memos to one's self, and can be conveniently carried in a pocket of the user. Although such devices provide a useful function, they can easily be left behind in pockets of clothing not worn or set aside and left in the office or home. Further, they do not allow for random access to any desired message. Also, with traffic increasing and highway speeds rising, fumbling with a pen, paper, or loose communication device can be dangerous.

SUMMARY OF THE PRESENT INVENTION

The visor of the present invention overcomes the awkwardness of having to write a memo on a memo pad while operating a motor vehicle and incorporates a digital voice recorder which is conveniently located within the body of a visor such that it is positioned for convenient use by the vehicle operator when driving to and from work or other destinations. The digital voice recorder is preferably located on the driver's side visor in a corner easily reached by the driver for recording and subsequently playing back short reminder messages. By providing a fixed location for the placement of a digital voice recorder, the user is assured of its location. By providing a convenient, easily accessible location in a visor body, maximum use of this convenient accessory is achieved. In a preferred embodiment of the invention, the digital recorder is controlled by a microprocessor to allow instant random access to any of a number of recorded messages.

These and other features, objects, and advantages of the present invention will become apparent upon reading the following description thereof together with reference to the accompanying drawings.

DETAILED DESCRIPTION OF THE PREFERRED EMBODIMENT

Figure 1:
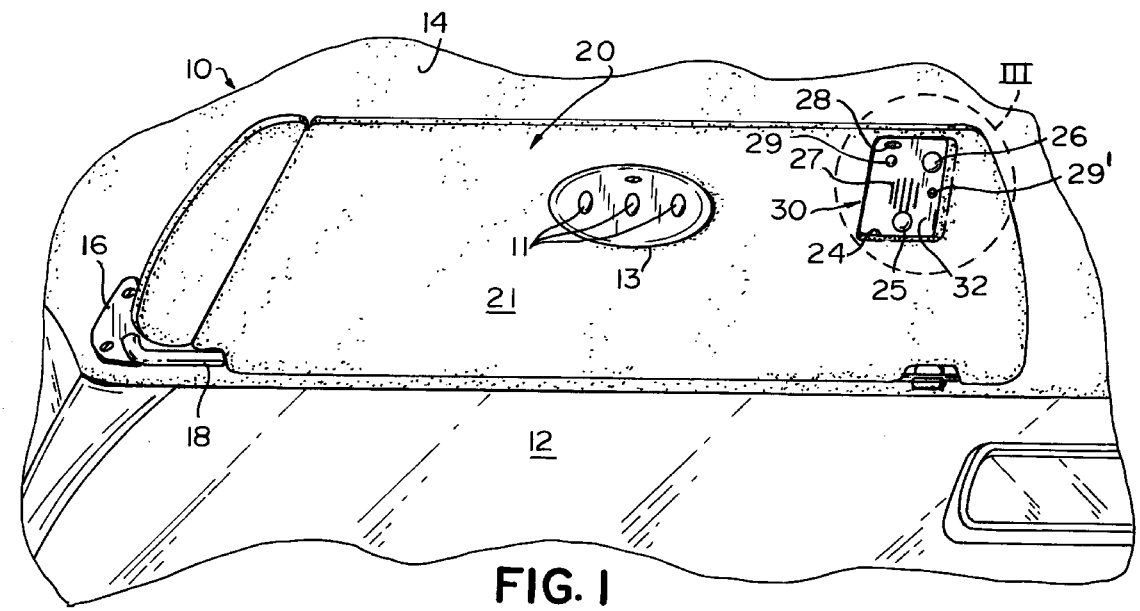
FIG. 1 is a perspective view of a vehicle including a visor incorporating the present invention.

Referring initially to FIG. 1, there is shown a vehicle 10, such as an automobile, having a windshield 12 above which there is mounted a visor assembly 20 of the present invention. Shown is the driver's side visor which includes a visor body 22 (FIG. 4) which can be of molded polymeric construction having a pair of halves integrally hinged together to form a clam-shell type construction for the body 22. Visor 20 is covered by suitable upholstery material 21 to conform the visor to the interior of the vehicle including, for example, the headliner 14 attached to the vehicle roof. Visor 20 is mounted to the vehicle roof by means of a elbow bracket assembly 16 which can be of conventional design and which includes a visor pivot rod 18 allowing the visor to be moved from a raised, stored position shown in FIG. 1 to a lowered, use position shown in FIG. 2 for providing sun blocking protection. The visor body includes a recess formed in a first side for receiving an illuminated vanity mirror assembly 19 (FIG. 2) which can be of the type disclosed in U.S. Pat. No. 4,227,241 and which includes a cover 17 and an illuminated vanity mirror positioned behind the cover. The cover can be pivoted between the closed position shown in FIG. 2 and an open position exposing the mirror and providing illumination.

Figure 3:
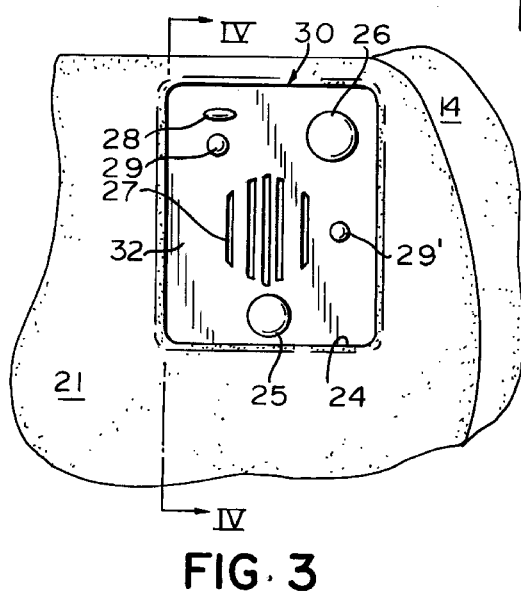
FIG. 3 is an enlarged, fragmentary, perspective view of a section of the visor shown by detail line III in FIG. 1.
Figure 4:
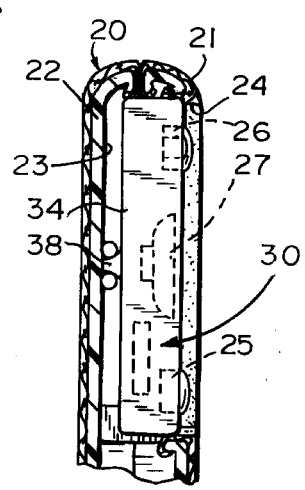
FIG. 4 is a cross-sectional view of the structure shown in FIG. 3 taken along lines IV—IV of FIG. 3.

The visor body 22 includes a second surface on a side opposite that of the vanity mirror assembly 19 which includes a rectangular recess 24 formed therein for receiving a digital voice recorder 30, as best seen in FIGS. 1, 3, and 4. Recess 24 is formed through one side of the visor core or body 22 and preferably has its peripheral edge covered with the upholstery material 21 to provide a trim appearance to the recess as seen in FIG. 3. Visor 20 further includes a trainable garage door opening transmitter 13 mounted to the visor body 22. Transmitter 13 includes three control switches 11 for operating up to three separate garage doors or other home-based accessories. Transmitter 13 is disclosed in detail in U.S. Pat. No. 5,442,340, the disclosure of which is incorporated herein by reference.

Mounted within the generally rectangular recess 24 of the visor is a digital voice recorder 30 which can be a self-powered, battery-operated device which is commercially available from a number of sources. The digital voice recorder preferably is custom manufactured for the visor and includes a digital voice integrated circuit chip such as an ISD 1000 AP and suitable interface circuitry. In the preferred embodiment of the invention, the digital voice recorder is coupled to the automobile electrical system for receiving operating power. The device has dimensions compatible with the insertion into recess 24 of a visor body since its thickness is less than one-half inch and its rectangular dimensions are approximately two inches by three inches.

The visor body 22 has a recess 24 formed in the upper right-hand corner of the second surface, as seen in FIG. 1, which provides an ideal location for the digital voice recorder 30. Recorder 30 integrally includes a record switch 25, a playback switch 26, a concealed speaker 27, a concealed recording microphone 28, a two-color LED indicator 29 indicating which mode the device is in, and a message delete switch 29'. Voice recorder 30 includes these circuit elements mounted in a polymeric housing 32 having a rear surface 34 (FIG. 4) which can be attached to the inner surface 23 of visor core 22 by means of a snap fastener 38 for securing the voice recorder within the recess 24 of the visor body. Other fastening means, such as Velcro® hook-and-loop fastener or an adhesive, likewise could be employed or the aperture 24 can be dimensioned such that the recorder simply snugly fits therein, although it is preferable to anchor it utilizing a suitable fastener. The recorder may also be removable for replacement of the battery, if the unit is battery powered. Also, the recorder can be designed such that the speaker and microphone are concealed under the visor fabric with only the operating switches and display LED exposed.

To record a message, the record switch 25 is momentarily pressed and the speaker chirps and the two-colored LED 29 illuminates red. The operator then speaks a message, the length of which is limited only by the memory selected for the recorder. After recording a message, the record switch 25 is again momentarily pressed to stop the recording. The speaker chirps and LED 29 turns off.

To play a previously recorded message, the operator momentarily presses the play switch 26, the speaker chirps and the green portion of two-color LED 29 blinks. The first recorded message plays, and the LED turns off. If more than one message has been recorded, the operator again momentarily presses play and repeats the process to play back all of the messages. If no messages remain, pressing the play switch again returns the playback to the first message If the play switch is pressed during message playback, the system skips to next message and begins playback.

To delete a previously recorded message, first the message is played as noted above. The operator, either during playback or immediately following playback, actuates delete switch 29', and a message "Are you sure?" is played. Pressing the delete switch again within 2 seconds deletes the selected message and the recorder plays the message "Message deleted".

Figure 5:
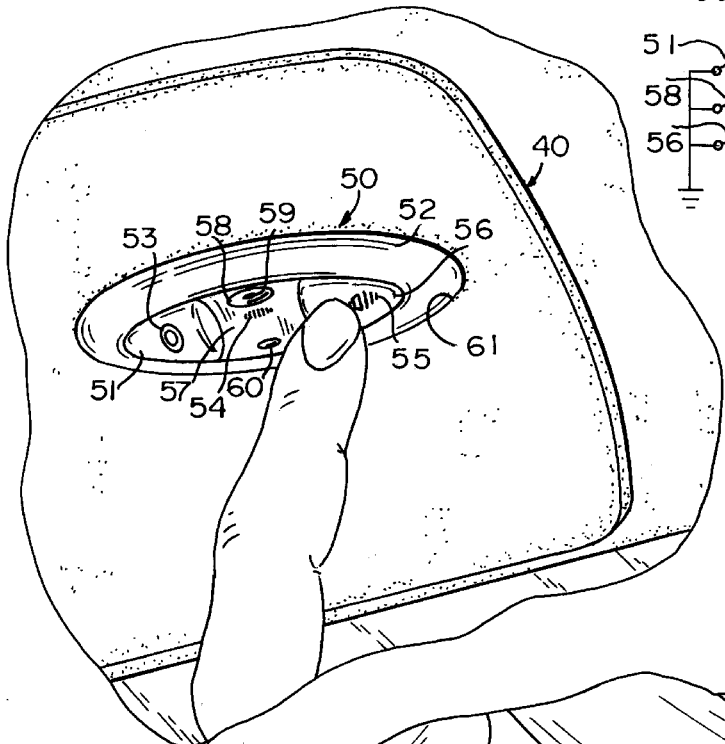
FIG. 5 is a fragmentary perspective view of a visor incorporating a microprocessor controlled digital voice recorder of an alternative embodiment of the present invention.

A digital recording device can be integrated as original equipment within a visor 40, as shown in FIG. 5. Visor 40 includes a digital recording device 50 integrated within the body of the visor and located in the upper right-hand corner of, for example, the driver's side visor illustrated. The digital recording device 50 includes a generally oval bezel 52 for receiving and supporting the user interface controls including a record push-button switch 51, which includes a microphone indicia 53 printed on the face thereof for illustrating to the user that it is the record switch. Also incorporated within the bezel 52 is a center located microphone/speaker 54, which can be a relatively small ceramic device which is commercially available. Further, the bezel supports a playback push-button switch 56 including a speaker indicia 55 thereon for indicating to the user the fact that the switch is for playing back existing messages. The bezel further supports a delete switch 58 having indicia such as a line 59 drawn therein indicating that it is to be used for deleting prerecorded messages. Finally, the bezel 52 supports a multicolored indicator 60 which can be a multicolored LED indicating recording playback and memory status of the device as described below in connection with the device's operation. The bezel 52 can be integrated into an original equipment visor 40 having a folded, butterfly-type core with an oval aperture or recess 61 through one side with the bezel 52 including snap-in tabs for securing the bezel, the switches, LED's and control circuit mounted thereto into the aperture formed in the visor body. If desired, the device 50 can be removably mounted as in the first embodiment.

The bezel provides a neat and trim, relatively compact appearance for the device and one which conforms to the clean appearance of modern vehicles. The push-button control switches can be conventional popple-type switches or other relatively small switches, although it is desirable to have the record and playback switches have a control surface size which is relatively large and significantly larger than the delete switch to provide a convenient control for operation of the digital recording device. Thus, switches 51 and 56 each occupy approximately one-third of the area of the bezel and are significant in size with respect to the bezel. By orienting the switches in a substantially linear fashion within the bezel 52 with the record switch on the left, the play switch spaced apart and on the right with the delete switch centered, an easily remembered tactile control is provided for the digital voice recorder to allow its use without the need for the driver to remove his or her eyes from the road during use. For such purpose also, the center area 57 of the bezel 52 can be recessed in a concave fashion to further tactilely separates switches 51 and 56. The bezel 52 can be made of a suitable polymeric material and colored and textured to conform the device to that of the interior of the vehicle. The switches, LED, speaker/microphone, and other electrical circuitry can be mounted behind the bezel utilizing conventional mounting techniques.

Figure 6:
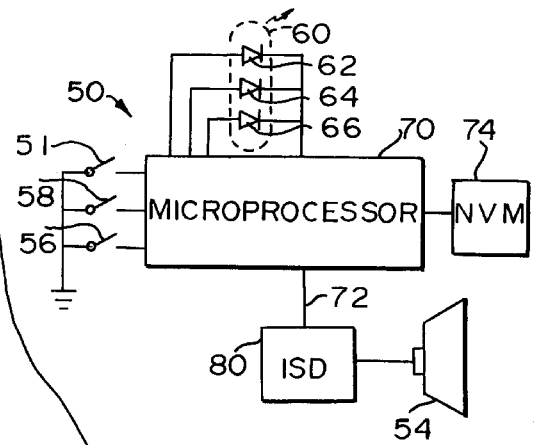
FIG. 6 is an electrical circuit diagram in block and schematic form of the circuit of the device shown in FIG. 5.

The electrical circuit of the digital voice recorder is shown in FIG. 6 and is centered about a microprocessor 70 programmed to facilitate use of the three-button operation of the digital voice recorder. Coupled to the input of microprocessor 70 is the record switch 51, the delete switch 58, and the playback switch 56. Microprocessor 70 is coupled to a digital voice recording chip 80 such as an ISD 1000 AP and for such purpose an address and control line 72 intercouples the microprocessor 70 with the ISD circuit 80. The microprocessor 70 is also coupled to a nonvolatile memory 74 which stores messages received temporarily stored by the ISD circuit 80 and is controlled by the microprocessor 70 to provide random access to such prerecorded, stored messages. The ISD circuit 80 is coupled to the combined microphone/speaker 54 for receiving voice information to be recorded and for playing back such recorded messages.

The microprocessor 70 is also coupled to a three color LED 60, which is shown schematically in FIG. 6, as including a red LED 62 indicating that the device is in a recording mode, a green LED 64 indicating that the device is in a playback mode, and an amber LED 66 providing notification to the user that no messages are recorded when attempting to playback any messages or that the memory is full when attempting to record a message. For such purpose, microprocessor 70 provides a signal to diode 66 which causes it to flash, thereby making it more noticeable.

Microprocessor 70 is programmed to receive inputs from the control switches 51, 58, and 56 and provide output control signals to the LED 60 as well as transfer information from the ISD 80 to the nonvolatile memory 74. The circuit shown in FIG. 6 is powered utilizing conventional power supply circuitry and is coupled to the battery supply line of the vehicle with the nonvolatile memory 74 serving to retain the messages in memory even if the battery supply line is disconnected either inadvertently or, as in some vehicle models, after a predetermined period of time. The microprocessor thus routes messages from the ISD recorder, to the nonvolatile memory and identifies repeated actuation of switch 51 to automatically skip to the message location corresponding to the number of actuations of switch 56. Thus, if the operator wishes to skip the first three stored messages, the operator actuates push-button switch 56 four times, with the four pulses being recognized by the microprocessor to address the nonvolatile memory to retrieve and playback through the ISD 80 the fourth recorded message. In this matter, a relatively easily used three-button control system can be employed to provide random access to stored messages which otherwise is not easily available through either analog devices or previously known portable digital devices.

Microprocessor 70 is also programmed to recognize the actuation of record switch 51 to initiate a recording sequence and actuate LED 62 indicating to the operator that a recording is in process. The microprocessor, at the same time, polls the nonvolatile memory 74 to assure that there remains existent memory for such recording and, in the even that the memory is full, it extinguishes record light 62 indicating to the operator that memory has been exceeded. With the utilization of the nonvolatile memory 74 in connection with the ISD circuit 80, however, a sufficient amount of memory is typically available several messages.

Microprocessor 70 also detects the actuation of the delete switch 58 which, when actuated, will delete a message previously played. Successive actuation of the delete switch 58 will continue deleting messages in descending order. Thus, if the operator has reviewed message twelve and actuates delete switch 58 three times, the microprocessor recognizes the command as deleting messages twelve, eleven and ten and reassigns the memory locations for future messages which are located at the end of the message chain such that the most recently recorded messages will be last in the sequence. The microprocessor, however, can be programmed in any desired manner and such that, when the playback switch is actuated the first time, the earliest or first message is played. In response to such actuation of switch 56, the green light LED 64 will be actuated during the course of the message playback. The microprocessor recognizes the end of the message and discontinues playback upon playback of the first message. Actuating the play switch twice will automatically, as noted above, skip the first message and access the second stored message.

Figure 2:
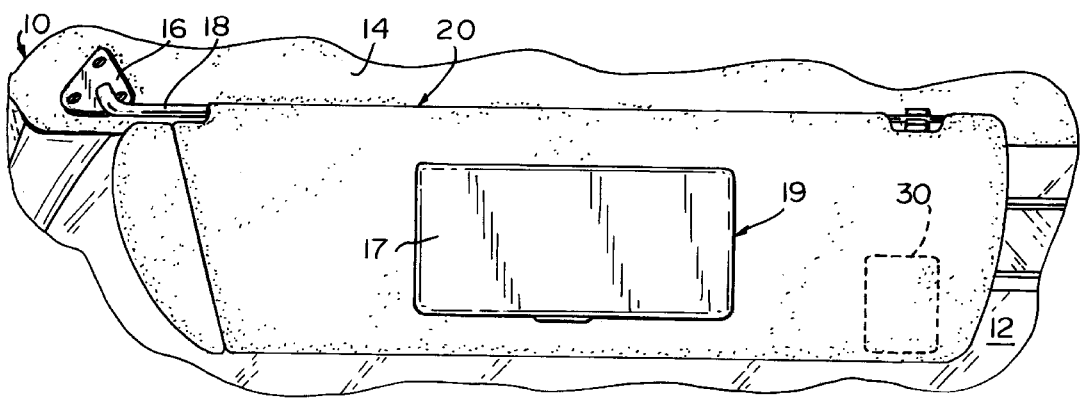
FIG. 2 is a perspective view of the visor shown in FIG. 1, shown in a lowered, sun blocking position.
Figure 7:
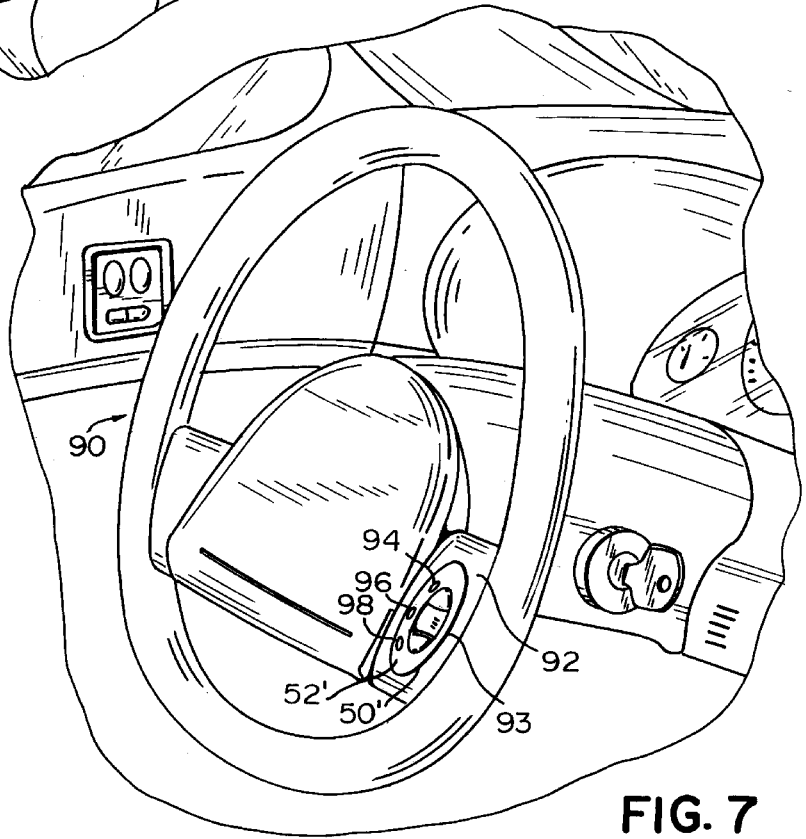
FIG. 7 is a fragmentary perspective view of a visor incorporating yet another embodiment of the present invention.

Although the digital voice recorder 50, shown in FIGS. 5 and 6, is preferably mounted in a visor 40 as shown, which may also include an illuminated vanity mirror assembly such as shown in visor 20 of FIG. 2, recorder 50 could likewise be mounted in the hub of the steering wheel of the vehicle which also provides a convenient location as illustrated in the alternative embodiment of FIG. 7 now described.

Referring now to FIG. 7, a steering wheel 90 is shown which is mounted to a steering column and may include a variety of switches and controls in the wheel as well as an air bag system in its center hub. Mounted in one of the spokes 92 of the wheel 90 to a surface facing the driver is a digital voice recorder 50' of the present invention which includes a bezel 52' incorporating the same voice recorder disclosed in connection with FIGS. 5 and 6 but is somewhat enlarged to include a lower section 93 which includes the now popular HomeLink® trainable transmitter system disclosed in U.S. Pat. No. 5,442,340 referenced above. The HomeLink® trainable transmitter comprises three control switches 94, 96, and 98 which can be actuated to learn and train the frequency and code of up to three existing remote controlled devices, such as existent garage door openers, gate controls or remote light controls. The microprocessor employed in connection with the HomeLink® trainable transmitter can be programmed to include the functions of microprocessor 70 or can be a separate and independent microprocessor if desired.

It will become apparent to those skilled in the art that various modifications to the preferred embodiments of the invention as disclosed herein can be made without departing from the spirit or scope of the invention as defined by the appended claims.

The invention claimed is:

1. A memo visor comprising:

a visor body including a recess formed therein;

a bezel for mounting a digital electronic voice recorder in said recess; and record and playback control switches for said digital electronic voice recorder, said record and playback switches being mounted to said bezel, wherein said bezel is generally elongated for mounting said record and playback switches in spaced-apart relationship at opposite ends of said bezel for easy use by an operator of the vehicle.

2. The memo visor as defined by claim 1 wherein said recess is formed in a corner of said visor body.

3. The memo visor as defined by claim 2 wherein said recess is located in an end of said visor body.

4. The memo visor as defined in claim 1 wherein said record and playback switches include indicia thereon identifying their respective control functions.

5. The memo visor as defined in claim 1 and further including a speaker/microphone mounted to said bezel between said playback and record switches.

6. The memo visor as defined in claim 1 wherein each of said playback and record switches has a dimension which occupies approximately one-third of a surface of said bezel.

7. A digital memo recorder comprising:

an accessory body for a vehicle, said body including a surface facing an interior of the vehicle;

a digital voice recorder;

a microprocessor coupled to said digital voice recorder for controlling said recorder to allow direct sequential access to messages recorded by said recorder;

control switches coupled to said microprocessor for controlling record, playback, and delete operations of said digital memo recorder; and a bezel for mounting said control switches in spaced relationship to one another and to said accessory body for easy access by an operator of the vehicle, wherein said bezel is elongated and said control switches include a playback switch and a record switch mounted near opposite ends of said bezel in spaced relationship to one another.

8. The digital memo recorder as defined in claim 7 wherein each of said playback and record switches has a dimension which occupies approximately one-third of a surface of said bezel.

\* \* \* \* \*